US005540304A

United States Patent [19]
Hawkins et al.

[11] Patent Number: 5,540,304
[45] Date of Patent: Jul. 30, 1996

[54] SINGLE-HANDLED VEHICLE BRAKE SYSTEM

[76] Inventors: Rollin D. Hawkins, 1115 NE. 52nd St., Seattle, Wash. 98105; David N. Krafchick, 1015 Nickerson #223, Seattle, Wash. 98119-1426

[21] Appl. No.: 379,127

[22] Filed: Jan. 27, 1995

Related U.S. Application Data

[63] Continuation of Ser. No. 82,041, Jun. 24, 1993, abandoned.

[51] Int. Cl.$^6$ .................. B62L 3/02; B62L 3/08
[52] U.S. Cl. ............... 188/24.15; 188/2 D; 74/501.6; 74/502.2
[58] Field of Search .............. 388/2 D, 24.14, 388/24.15, 24.16, 24.22, 106 A, 71.1, 72.2, 344, 349; 74/107, 501.6, 502.2, 489

[56] References Cited

U.S. PATENT DOCUMENTS

| | | | |
|---|---|---|---|
| 4,850,21 | 7/1989 | Buckley et al. | 74/502.2 |
| 1,535,092 | 4/1925 | Bell | 188/2 R |
| 3,554,334 | 1/1971 | Shimano | 188/349 |
| 3,782,507 | 1/1974 | Shreve | 188/2 D |
| 3,882,971 | 5/1975 | Peckham, Jr. | 188/24.16 |
| 3,942,609 | 3/1976 | Hill | 188/24.16 |
| 3,999,637 | 12/1976 | Schumacher | 188/106 A |
| 4,057,127 | 11/1977 | Woodring | 188/24.16 |
| 4,102,439 | 7/1978 | Calderazzo | 188/24.16 |
| 4,267,746 | 6/1981 | Pruett | 74/489 |
| 4,290,507 | 9/1981 | Brown | 188/72.6 |
| 4,391,352 | 7/1983 | Brown | 188/24.12 |
| 4,480,720 | 11/1984 | Shimano | 188/24.15 |
| 4,765,443 | 8/1988 | Cunningham | 188/24.21 |
| 4,773,510 | 9/1988 | Sato | 188/24.16 |
| 4,895,224 | 1/1990 | Sugihara | 188/24.14 |
| 4,969,539 | 11/1990 | Ishibashi | 188/24.12 |
| 5,012,900 | 5/1991 | Ishibashi | 188/24.12 |
| 5,368,136 | 11/1994 | Walte | 188/344 |

FOREIGN PATENT DOCUMENTS

| | | | |
|---|---|---|---|
| 0907754 | 4/1946 | France | 74/502.2 |
| 0056087 | 4/1944 | Netherlands | 74/502.2 |
| 621342 | 4/1949 | United Kingdom | 188/344 |

*Primary Examiner*—Robert J. Oberleitner
*Assistant Examiner*—Chris Schwartz
*Attorney, Agent, or Firm*—Jensen & Puntigam

[57] ABSTRACT

A transmission unit for bicycle brakes consisting of a single operating force input (10, 12) connected to a force multiplier (14) which distributes said multiplied force between two operating force outputs (16, 18) via a differential which equalizes the two operating force outputs while giving preferential motion of one of the outputs in the phase of motion prior to the full equalization of the multiplied operating force. This unit allows a single brake cable (12) from a control lever (10) to connect within the unit to a cam actuator follower which transfers this single operating force by means of a ratio modulating cam lever (26) which incorporates a guide pulley which moves via a fulcrum pivot axle (28) located between the cam structure and the guide pulley structure. This mechanism is combined with a cable (16, 18) which is looped around 180° of the guide pulley and which exits the unit in parallel paths in a direction of opposition to the motion of the cam structure via the pivot axle described. Each end of the pulley-actuated brake cable described connects to one of each of the two wheel brakes allowing equalization of the distributed force. A light friction generating device (32-36) within the unit connects to one of the two operating force outputs to insure preferential actuation of the rear wheel brake within the phase of operation of initial brake-to-wheel contact but prior to full operating force application, during which full equalization is desired so as not to compromise the efficient transfer of the operating force input to the two operating force outputs.

3 Claims, 3 Drawing Sheets

SINGLE-HANDLED VEHICLE BRAKE SYSTEM

This is a continuation of the application Ser. No. 08/082,041, filed on Jun. 24, 1993, abandoned.

TECHNICAL FIELD

This invention relates to brakes for a vehicle, and more particularly, to a one-handed braking system primarily designed for use on two-wheeled vehicles, wherein the mechanism both divides the output of a single lever between the two wheels preventing a lock up and further, multiplies the braking force, resulting in the equivalent of a two handled braking device.

BACKGROUND ART

Conventional brakes for motor-driven vehicles involve a single actuating lever, i.e., brake pedal which in turn hydraulically operates individual brake pads at each of the four wheels. However, early automobile braking was done mechanically and a single lever operated the brakes on all of the wheels, however, in some cases there was a mechanical advantage built into the braking system. Conventional braking systems for bicycles and the like usually involve a hand lever on each end of the handle bars such that one hand lever operates the front brake and the other hand lever operates the rear brake, allowing differential pressure to be applied therefor, essentially eliminating the possibility of over braking the front wheel causing a loss of control. Early developments in the braking systems for bicycles produced a braking system wherein if the operator applied excessive pressure to either of the brakes, this braking pressure could be equalized or directed with more pressure to the rear brake, rather than to the front brake.

As technology has progressed and a goal is to allow handicapped persons to have many of the same opportunities as non-handicapped persons, there is seen a need for a single-lever brake operating system which, firstly, incorporates the safety of directing the brake force to the rear wheel with greater force than the front wheel, at least initially, and secondly, permitting the single-lever brake mechanism to apply an equivalent amount of braking force to the brakes themselves as would have been applied had a standard two-hand operated, lever brake system been used.

Prior art references which disclose both the sequencing of brake application and the control thereof include:

U.S. Pat. No. 1,535,092, granted to Bell Apr. 28, 1925, which discloses a single foot pedal mounted brake system for an automobile wherein the service brake is effectively advanced prior to the emergency brake.

U.S. Pat. No. 2,460,204, granted to Vacher Jan. 25, 1949, discloses a brake actuating mechanism within the brake itself, wherein a cam surface controls the rate at which the individual brake pads are applied to the wheel.

U.S. Pat. No. 3,942,609, granted to Hill Mar. 9, 1976, discloses a device wherein, regardless of whether the left or right hand brake is actuated the rear brake of this bicycle is preferentially actuated, utilizing springs, levers and pulleys to provide a bias to resist movement of the front brake actuator.

U.S. Pat. No. 4,057,127, granted to Woodring Nov. 8, 1977, discloses a device which mechanically provides a preference to the rear brake actuator on a bicycle.

U.S. Pat. No. 4,267,746, granted to Pruett May 19, 1981, discloses a single hand-operated actuator for effecting operation of two brakes, i.e., front and rear, and includes a spring bias means within the hand actuator to provide preferential actuation to the rear brake.

U.S. Pat. No. 4,480,720, granted to Shimano Nov. 6, 1984, discloses a device for use with either one or two control levers, wherein the initial braking input provides a proportionately greater force to the rear wheel brake than the front, and thereafter the input is redistributed in a greater proportion to the front.

U.S. Pat. No. 4,582,178, granted to Huneault Apr. 15, 1986, discloses a brake system for a bicycle wherein the tilting of the bicycle seat actuates the brakes.

U.S. Pat. No. 4,644,816, granted to Cockburn Feb. 24, 1987, discloses a brake actuator, including a single mounted handle actuating means wherein the attachment of the brake actuating cables to the actuator determines the order in which the brakes are applied.

U.S. Pat. No. 4,765,443 to Cunningham dated Aug. 23, 1988 discloses a cam actuator for bicycle brakes but utilizes the cam to control the actuation of the brake pads themselves and does not provide for actuation of more than one brake from a single source.

U.S. Pat. No. 4,773,510, granted to Sato Sep. 27, 1988, discloses a pair of hand brakes for a bicycle, each attached to a single actuating member in a physical fashion such that the one brake is preferentially actuated regardless which of the handle members is engaged.

DISCLOSURE OF THE INVENTION

With the above-noted prior art in mind, it is an object of the present invention to provide a single-pull brake mechanism for a bicycle, wherein a single cable leading from the brake actuating handle operates a conversion mechanism which both divides the force provided by the actuating mechanism to the front and rear brakes at a pre-determined ratio, but also provides a force multiplying means whereby the bicycle may be more quickly stopped with one hand.

It is another object of the present invention to provide a conversion means for a braking system, wherein the operation of a cam and follower device divides the initiating force and multiplies the initiating force such that a single actuating force can, in fact, have the same effect as a double actuating force.

It is still another object of the present invention to provide a force multiplying and dividing mechanism of a size such that is convenient and realistic to use upon a bicycle.

It is yet another object of the present invention to provide a brake actuating mechanism, wherein the single-lever brake handle moves an actuating wheel along a pre-determined path while simultaneously actuating a contoured cam lever which controls the rate of movement of a pair of outgoing cables as well as the force applied thereto.

BEST MODE FOR CARRYING OUT THE INVENTION

Figure 1:
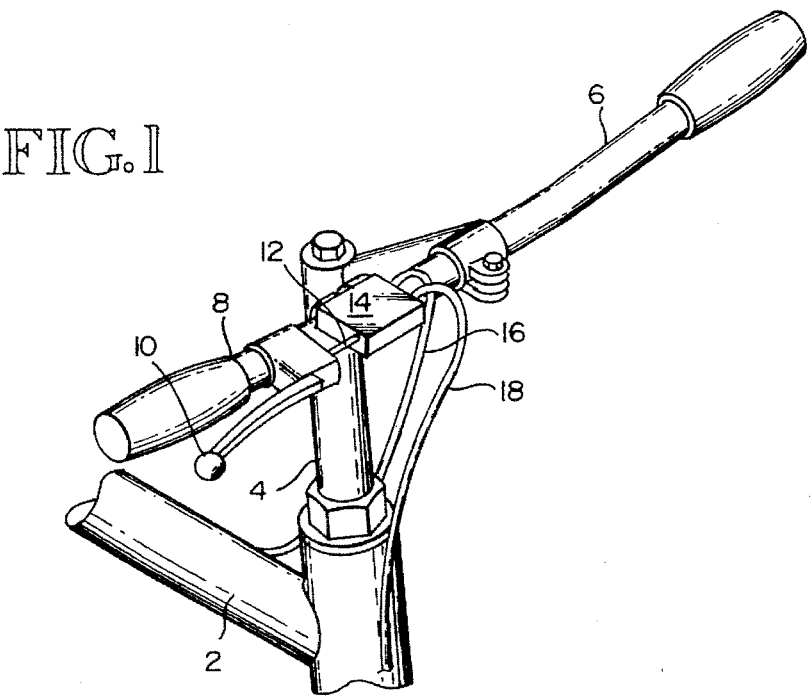
FIG. 1 is an isometric view of the single-handle brake mechanism as attached to a mountain bike as well as the conversion mechanism likewise mounted to the handle bar itself.

As seen in FIG. 1, the illustrative bicycle includes a frame 2, a stem 4, a pair of outwardly extending handle bars 6, 8 and a single brake actuating member 10, having a cable 12 leading to a conversion mechanism 14, to be described in detail hereinafter and a pair of cables 16, 18 leading respectively to the front and rear brakes of the bicycle. The cables would normally operate within a protective sheath or tube.

Figure 2:
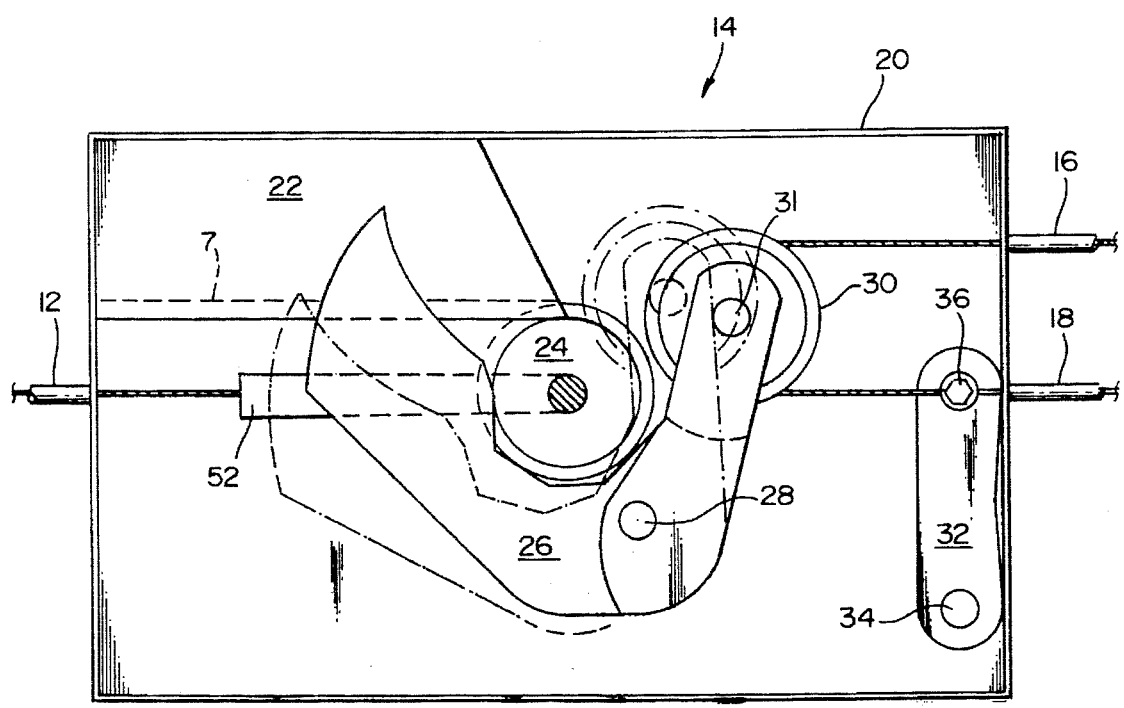
FIG. 2 is a plan view of the force conversion mechanism of the present invention.

Reference is now made to FIG. 2, wherein it can be seen that the present conversion mechanism, generally designated as 14, is contained within a box-like mechanism 20, which is preferentially 9 centimeters by 6 centimeters by approximately one inch in thickness. As can be seen in this view, the brake actuating cable 12 from the actuating handle 10 enters the box and the transmission cables to the front and rear brake mechanism exits the container. The mechanism within the box includes a pair of guide members 22, 24, only one of which is shown in this view. A pulley mechanism described in greater detail hereinafter is actuated by incoming brake cable 12 which pulls the pulley mechanism 24 to the left as seen in this view. A cam lever combination generally designated as 26 pivots about an axle 28 in response to the movement of pulley mechanism 24 and, in turn, moves pulley member 30 mounted to follower lever member 26 as at 32, causing the brake actuating cables 18 and 16 to effectively engage the brakes. It is to be noted that there is a tension adjusting member shown as a lever 32 pivoted about an axle 34 which would include a resistant spring member and a friction member 36 such that the speed and force at which the front brake responds is different from that of the rear brake.

Figure 3:
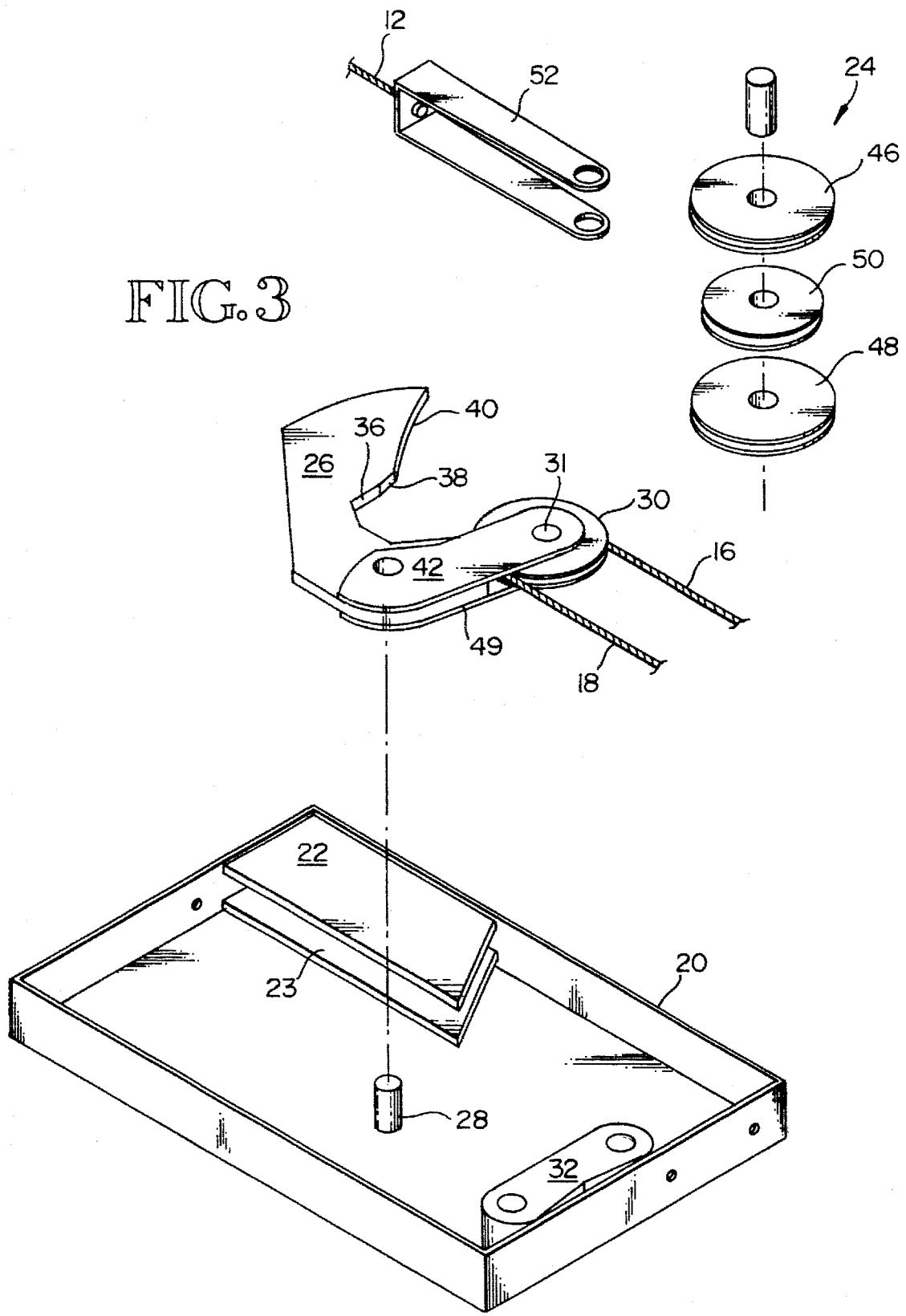
FIG. 3 is an exploded view of the force conversion mechanism of FIG. 2.

Reference is had to FIG. 3, wherein the container 20 shown to be a rectangular member having integral guide members 22, 23, axis 28 and having mounted therein adjustment lever 32. Exploded from the container 20 is the cam follower lever member 26 which includes a single plate first end having cam surfaces 36, 38 and 40, wherein preferentially cam surface 36 is at 20° to an axis parallel to the ends of the container 20 across the narrow dimension of the container wherein 4 millimeters of movement of the cable 12 causes 4 millimeters of movement of the brake actuating cables, i.e., a rapid movement to wheel contact. Cam surface 38 preferentially at approximately 50° to an axis parallel to the ends of the container 20 across the narrow dimension of the container is designed to increase the power by at least 50% greater than the input power and the curved arc is to provide constant power to the brake mechanisms. As can be seen, the second end of cam lever member 26 is bifurcated having a pair of plates 42, 44 mounting a pulley 30 therebetween which, as explained here and above, actuates the brake cables 16, 18. The main pulley mechanism which is actuated by the cable 12 to the hand lever includes a pair of pulley members 46, 48 which ride along guide member 22, 23 and a central smaller pulley member 50 which is the follower for cam lever member 26. The actuating cable 12 is provided with a U-shaped member 52 which attaches the pulley member 24 to the input cable 12.

Figure 4:
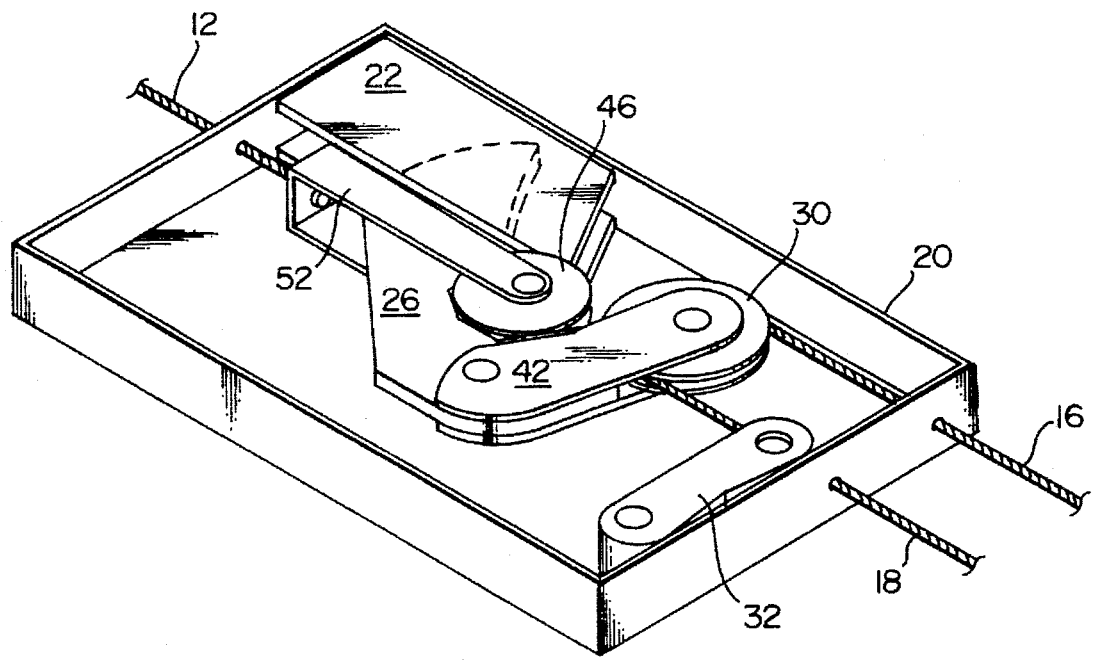
FIG. 4 is an isometric view of the force conversion mechanism of FIG. 2.

Reference is now had to FIG. 4, which discloses those elements of FIG. 3 in their operating condition and similar numbers are used to designate similar parts.

The hereinabove-described mechanism converts the motion and force from a single source, altering the motion and force while preferentially distributing the force to more than one end use.

Thus, as can be seen, the present invention comprises a simple, straightforward device for providing a brake mechanism for a single brake lever as effective as is currently available for those using two brake levers.

We claim:

1. A wheeled vehicle having a pair of wheels, a brake unit including a caliper and brake pads at each wheel and a single hand generated lever to actuate said brake units through a cable interconnect, the improvement comprising:

means intermediate the hand lever and the brake units which multiplies the force generated exclusively by the hand lever and equalizes the resulting multiplied force generated as applied to each brake unit resulting in a smooth, easy braking operation.

2. A vehicle as in claim 1, wherein the force multiplying means comprises a lever including a predetermined cam face which when acted upon by a follower interconnected with said hand operated lever multiplies the force and directly modulates the force at the brake units.

3. A single-handle mechanical brake system for a vehicle, including brake units at each wheel, comprising:

a container for enclosing a force multiplying mechanism which includes, a fixed axle extending between two opposing sides of the case, a pivoting cam lever mounted for rotation about said axle, said cam lever having a first pulley means mounted to one end thereof, said pivoting cam lever having a specifically contoured surface at the opposite end thereof, a second pulley means secured to the end of a cable activated by a brake handle, said second pulley means being guided along a line substantially parallel to the cable and interacting with the contoured surface of the pivoting cam lever to cause said cam lever to pivot about its axle, and a cable extending over said first pulley means having its ends respectively secured to the brake units whereby the actuation of the lever causes substantially equal pressure to the brake units at a multiple of the braking input pressure, said multiple determined by the cam surface.

* * * * *